(12) United States Patent
Kang et al.

(10) Patent No.: US 7,411,368 B2
(45) Date of Patent: Aug. 12, 2008

(54) ELECTRIC MOTOR SPEED CONTROLLER FOR VEHICLE

(75) Inventors: Tien Yew Kang, Singapore (SG); Kian Teck Teo, Singapore (SG); Yubin Liu, Singapore (SG)

(73) Assignees: Matsushita Electric Industrial Co., Ltd., Osaka (JP); Panasonic Semiconductor Asia Pte. Ltd., Singapore (SG)

( * ) Notice: Subject to any disclaimer, the term of this patent is extended or adjusted under 35 U.S.C. 154(b) by 113 days.

(21) Appl. No.: 11/559,139

(22) Filed: Nov. 13, 2006

(65) Prior Publication Data

US 2008/0112694 A1  May 15, 2008

(51) Int. Cl.
*G05B 11/28* (2006.01)

(52) U.S. Cl. .................. 318/599; 318/811; 318/400.06; 318/400.13; 388/811

(58) Field of Classification Search ................. 318/599, 318/811, 400.06, 400.13, 715, 721; 388/811
See application file for complete search history.

(56) References Cited

U.S. PATENT DOCUMENTS 6,727,668 B1   4/2004  Maslov et al.
2006/0238151 A1*  10/2006  Okamoto ................ 318/254

* cited by examiner

*Primary Examiner*—Karen Masih
(74) *Attorney, Agent, or Firm*—Greenblum & Bernstein, P.L.C.

(57) ABSTRACT

An electric motor speed controller for use in a bicycle includes a motor to provide a propulsion force to move the bicycle. The actual motor speed and a target motor speed are compared, and if the actual motor speed is lower, more current is supplied to the motor, and if the actual motor speed is higher, less current is supplied to the motor.

11 Claims, 3 Drawing Sheets

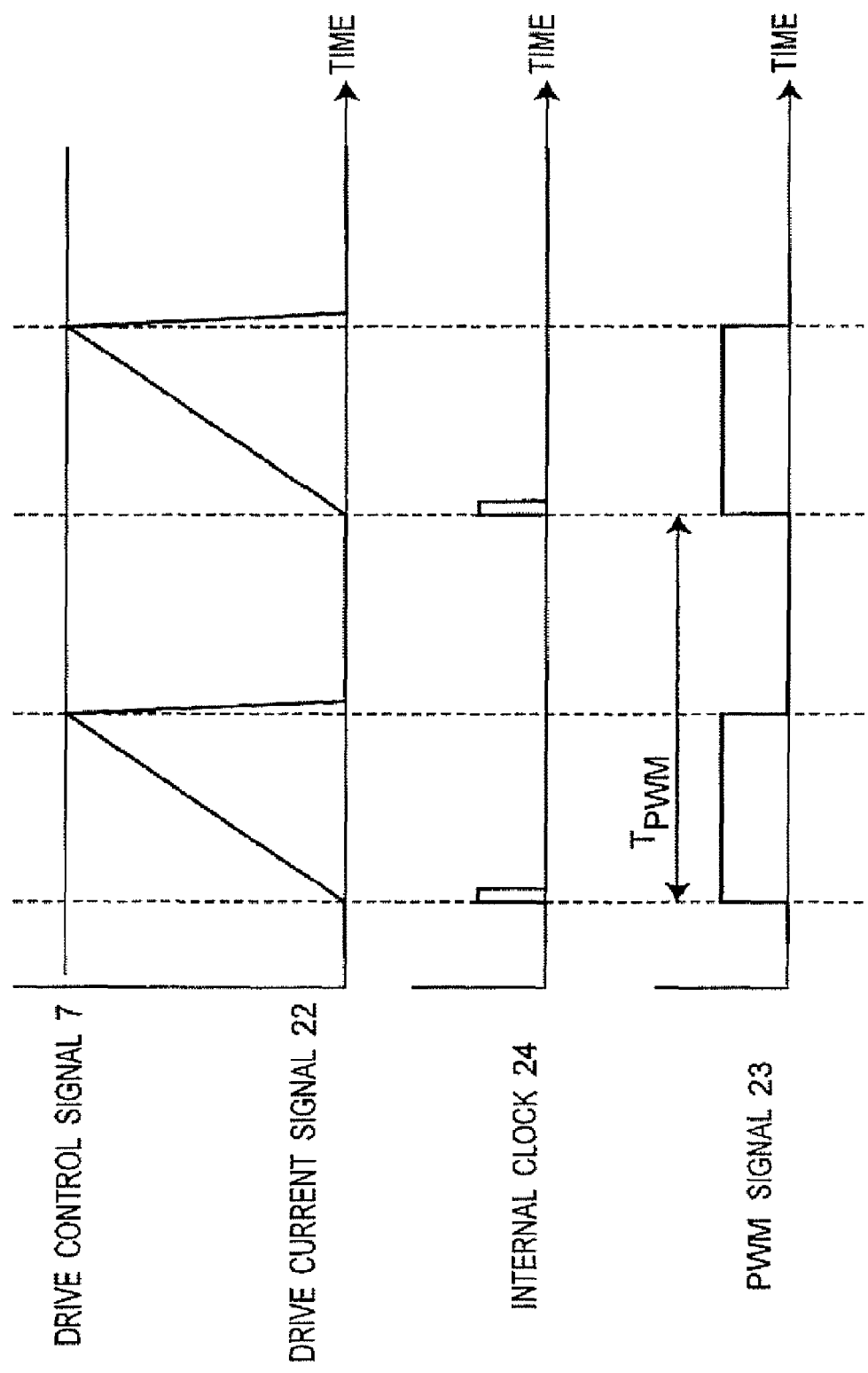

ELECTRIC MOTOR SPEED CONTROLLER FOR VEHICLE

BACKGROUND OF THE INVENTION

The present invention relates to an electric motor speed controller for vehicles, and more particularly, to an electric bicycle.

Currently, makers of electric vehicles are commonly using programmable microcontroller solution for controlling the vehicle speed One of these solutions is found in U.S. Pat. No. 6,727,668 B1, the block diagram of which is shown in FIG. 1.

The controlling algorithm is pre-programmed in programmable microcontroller 144, where one of the external inputs is the user's throttle command. Multiphase motor 110 is formed by a rotor 120 and stator 130. DC source 140 drives different phases of the motor via switch sets 142, which are controlled by the controller 144 via gate drivers 146. Current conditions of different phases are feedback to controller 144 by current sensor 148, while position and speed information is feedback via position sensor 146 and speed approximator 150 respectively. According to these feedback signals, controller 144 adjusts switch sets 142 to achieve the reference, the user input.

However, due to the use of programmable microcontrollers, this solution is costly. The present invention overcomes this drawback by using simple logic gates and counters to implement the motor speed controller. It can be integrated easily into silicon and hence provide a lower cost system solution where no programmable microcontroller is required.

SUMMARY OF THE INVENTION

An object of the present invention is to replace the programmable microcontroller on motor speed control system with a cheaper and simpler solution, which consists of simple logic gates and counters.

According to the present invention, an electric motor speed controller for vehicles comprises: a motor operable to provide a propulsion force to move the vehicle; a position sensor provided on the motor to produce position information of the motor; a motor speed counter operable to produce actual motor speed signal; a motor power driver operable to deliver electric power to the motor and to produce a drive current signal; a PWM logic control operable to control the motor power driver based on the position information and a PWM command signal; an analog comparator operable to compare the drive current signal with a drive control signal and to produce the PWM command signal; an input voltage setting device operable to produce a target motor speed signal; an analog comparator operable to compare the actual motor speed signal with the target motor speed signal and to produce a comparison result; and an up/down counter operable to increase or decrease number of counts based on the comparison result, and to produce the drive control signal.

The main difference between present invention and prior art is the replacement of the programmable microcontroller (144 as shown in FIG. 1), inside which the controlling algorithm is programmed.

According to the present invention, the control loop is implemented using simple logic gates, comparators and counters that can be cheaply and easily integrated on a silicon chip. The unique feature of the present invention is making use of analog comparator to compare the vehicle user's input command with the running speed of the motor for a speed decision command. And this speed decision command is used by an up/down counter for controlling the speed of the motor.

The usage of an up/down counter offers the advantage of seamlessly switching between open loop and close loop operation without much disturbance to the speed loop, as there is no sudden change in the DAC value. The nature of the up/down counter which only changes one count at a time also therefore makes the system more stable. Additional feature such as cruise control function can be implemented with the addition of a latching register and digital comparator for comparing reference speed with actual speed.

BRIEF DESCRIPTION OF THE DRAWINGS

FIG. 3 shows the timing diagram of PWM signal with respect to the internal clock and the current sensing voltage.

DETAILED DESCRIPTION OF THE PREFERRED EMBODIMENTS

An electric motor speed controller for vehicles according to the present invention can be applied to many electric vehicles, such as a bicycle, a tricycle, a wheelchair, a shopping cart or any other vehicle with wheels. Here, an electric bicycle is taken as an example for illustration. It should be noted that an electric bicycle is only one example of electric vehicles, and it is here only for illustrative purpose.

The electric motor speed controller for vehicles is able to operate in two modes, namely, throttle mode and cruise mode. The following illustrates throttle mode configuration.

Figure 1:
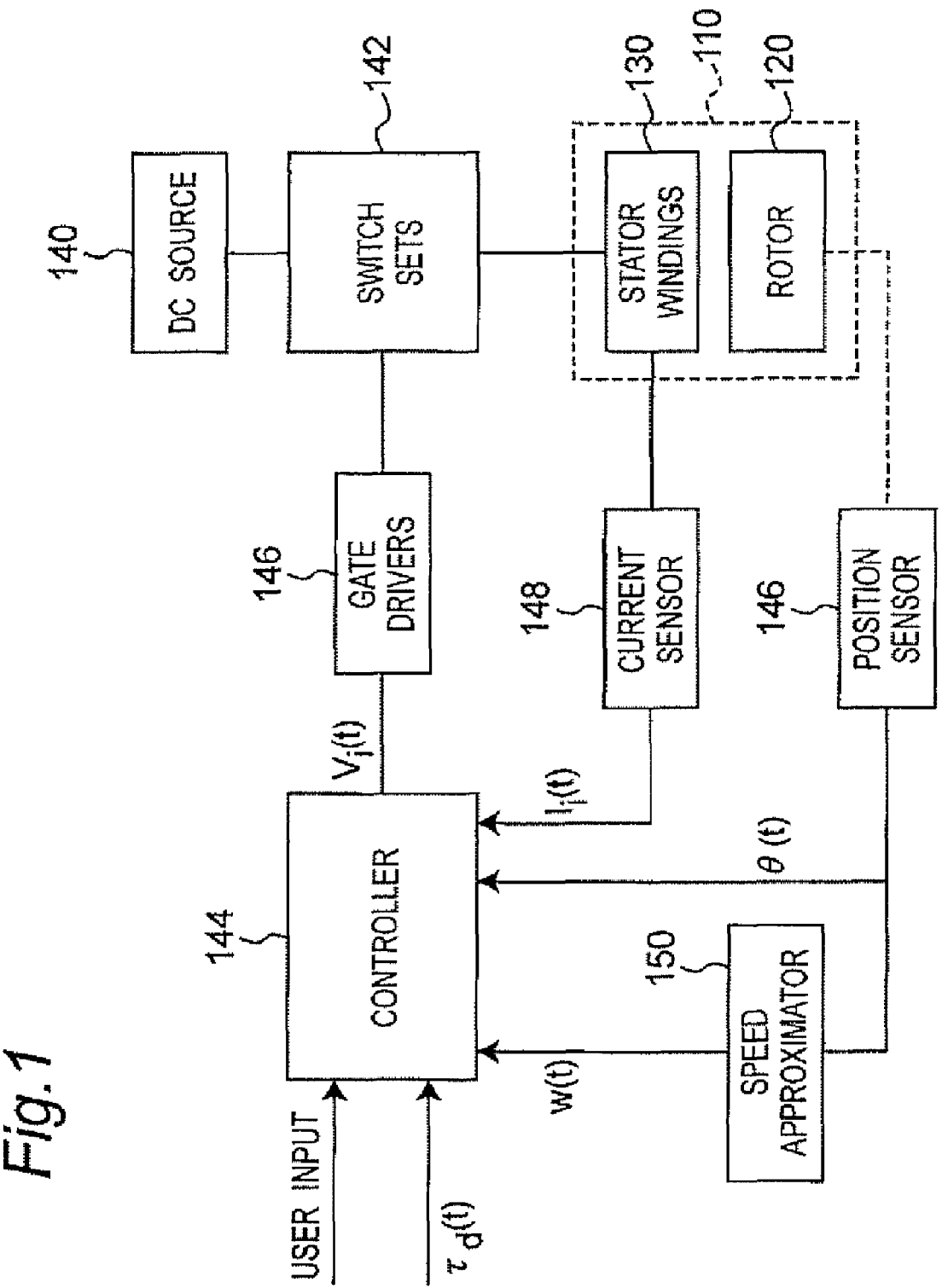
FIG. 1 is a block diagram showing the conventional motor speed control solution using programmable microcontroller.
Figure 2:
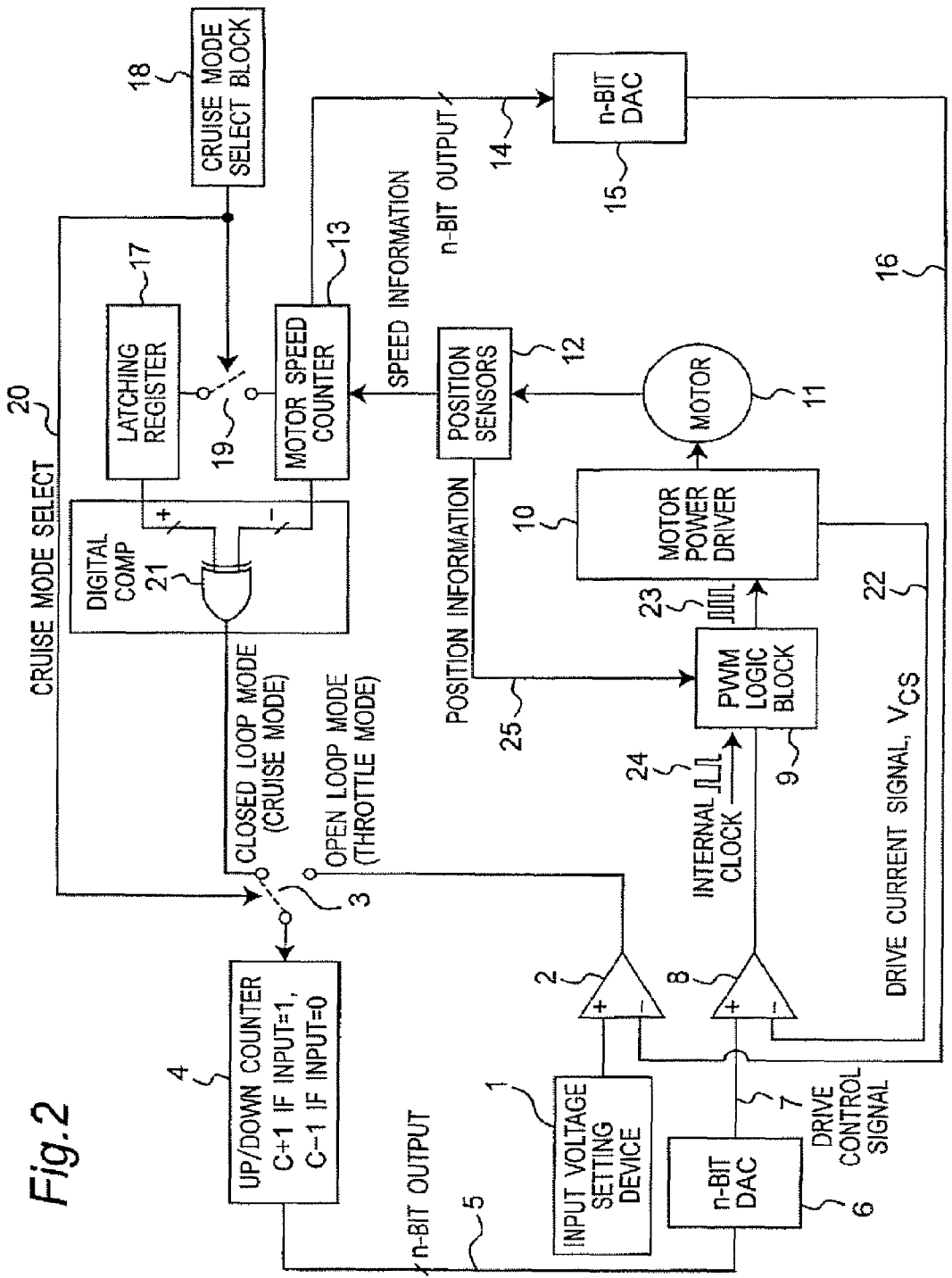
FIG. 2 is a block diagram showing a motor speed control architecture using simple counters and logics of Embodiment according to the present invention.

Referring to the FIG. 2, the electric motor speed controller for vehicles has a motor 11 connected to a wheel (not shown) of the bicycle for providing the driving force to the wheel, and one or more position sensors 12 for detecting the angular position of the motor as well as the angular speed of the motor. The electric motor speed controller further has the following items. A motor speed counter 13 for producing an actual motor speed signal based on the angular speed of the motor from the position sensors 12. An n-bit DAC (digital to analog converter), a comparator 2 for comparing the actual motor speed signal with a target motor speed signal produced from an input voltage setting device 1. An operator may turn a dial (not shown) on the input voltage setting device 1 to set a target motor speed. The comparator 2 produces a comparison result, for example, a HIGH when the target motor speed signal is higher than the actual motor speed signal, and a LOW when the target motor speed signal is lower than the actual motor speed signal. A switch 3 for selecting between a throttle mode operation and a cruise mode operation. An up/down counter 4 counts up if the input thereto is HIGH, and counts down if the input thereto is LOW, and for producing a drive control signal 5. An n-bit DAC 6 converts the drive control signal 5 in digital format to analog format 7. A comparator 8 compares the drive control signal 7 with a drive current signal 22 and produces a PWM command signal. A PWM (pulse width modulation) logic block 9 receives the PWM command signal from comparator 8 and an internal clock 24 and generates a PWM signal 23. A motor power drive 10 receives PWM signal 23 and supplies drive current to motor 11, and also produces the drive current signal 22. The above arrangement is provided for carrying out the throttle mode operation.

The electric motor speed controller for vehicles further has the following items for carrying out the cruise mode operation.

A cruise mode select block 18 produces a cruise mode select signal 20 when the operator selects a cruise mode operation. Motor speed counter captures real-time speed information, which is transferred to a latching register 17 via a latch switch 19. In response to the starting edge of the cruise mode select signal 20 the latch switch 19 instantaneously disconnects the motor speed counter 13 with the latching register 17. Thus, the latching register 17 latches the latest motor speed signal just before the starting edge of the cruise mode select signal 20. A digital comparator 21 compares the latched motor speed signal from the latching register 17 with current motor speed signal (the motor speed signal produced after the latching) from the motor speed counter 13. The comparator 21 produces a speed comparison result. For example, if the current motor speed is higher than the latched motor speed signal, the comparator 21 produces a LOW, and if the current motor speed is lower than the latched motor speed signal, the comparator 21 produces a HIGH. The switch 3 changes the connection to up/down counter 4 selectively between the comparator 2 and the digital comparator 21. When the cruise mode select signal 20 is produced, the switch 3 is so turned to connect the digital comparator 21 with the up/down counter 4. When the cruise mode select signal 20 is not produced, the switch 3 is so turned to connect the comparator 2 with the up/down counter 4.

Next, the throttle mode operation is described.

The comparator 2 receives the target motor speed signal from the input voltage setting device 1, which is in the form of a throttle voltage of an electric bicycle commanded by the bicycle rider.

The target motor speed signal is fed to analog comparator 2's non-inverting input terminal (indicated by "+"). The actual motor speed signal 16 from n-bit DAC 15 is fed to comparator 2's inverting input terminal (indicated by "−") When the voltage level at its non-inverting input terminal is higher or lower than that at its inverting input terminal, its output is set to HIGH or LOW, respectively.

The output of analog comparator 2 is applied to the up/down counter 4 via switch 3. The up/down counter 4 increments the count when analog comparator 2's output is HIGH and decrements the count when the output is LOW. The output of the up/down counter 4 is an n-bit binary code 5 that is applied directly to the input terminals of an n-bit DAC 6. The n-bit DAC 6 converts the code 5 to an analog signal 7, i.e., the drive control signal.

The drive control signal 7 is subsequently compared with a drive current signal 22 by the analog comparator 8. The drive current signal 22 is proportional to the drive current in motor 11. The output of comparator 83 which is the PWM command signal, is applied to the PWM logic block 9 which controls the turning on and off of a motor power driver 103 which can be a half bridge power driver 105 or any other types of power driver.

Referring to FIG. 33 the timing relationship between the drive control signal 7 and the drive current signal 22, as well as the PWM signal is shown. Upon turning on of the PWM signal 23, a current supply from the motor power driver 10 to the motor 11 starts. Thus, the drive current signal 22 starts to increase in response to the turning on of the PWM signal 23. Then, when the drive current signal 22 becomes equal to or exceeds the drive control signal 73 the comparator 8 produces LOW (PWM command signal) to terminate the PWM signal 23. Thus, the current supply from the motor power driver 10 to the motor 11 terminates. This operation is carried out after every internal clock 24 which is produced after every phase of the motor 11.

For a multiphase motor, a feedback signal containing position information 25 from position sensors 12 is fed to the PWM logic block 9. This position feedback signal is decoded within the PWM logic block 9 and determines which motor phase to turn on or off. The whole process repeats, and forms a current sensing loop to control duty cycle of motor's different phases.

When comparator 8 output is LOW, it means that the motor current is higher than what the drive control signal 7 is commanding, or the actual motor speed is higher than intended. Hence, PWM logic block 9 will command the motor power driver 10 at a lower duty cycle through the current sensing loop. As a result, the motor current decreases, resulting in a lower motor speed.

When comparator 8 output is HIGH, it means that the motor current is lower than what the drive control signal 7 is commanding, or the actual motor speed is lower than intended. Hence the PWM logic block 9 will drive the motor power driver 10 at a higher duty cycle for a higher motor current and motor speed.

The motor is equipped with position sensors 12, which can be in the form of Hall sensors. Output of these Hall sensors is real time speed information, which is captured by motor speed counter 13. The purpose of motor speed counter 13 is to count and extract the time between two consecutive Hall sensor signal edges, therefore obtaining the speed.

The motor speed counter output 14 has a higher count value when the motor speed is faster. The counter output 14 is applied to the n-bit DAC 15, which outputs the actual motor speed signal 16 to analog comparator 2.

The system under the throttle mode is controlled as follows. Speed information is fed to motor speed counter 13 by position sensors 12. The motor speed counter 13 subsequently outputs an n-bit binary code 14 to n-bit DAC 15. When the motor speed is low, DAC 15 outputs a low actual motor speed signal 16. If the actual motor speed signal 16 is less than the target motor speed signal from the input voltage setting device 1, analog comparator 2 produces HIGH. Up/down counter therefore increases its count, leading to a higher drive control signal 7 from DAC 6. Based on comparison result from comparator 8, motor demands more current, and increases speed. The speed information is again fed to motor speed counter 13. Conversely, when speed is high, the control mechanism will regulate by decreasing the current in motor.

Eventually the actual motor speed signal 16 will be settled to a voltage level close to the target motor speed signal and the up/down counter output 5 will be counting within a +/−1 count range. Thus the current in the motor 11 is set by the target motor speed signal.

Next, the cruise mode operation is described.

The cruise mode operation is set by latching the motor speed signal and by turning switch 3 to closed loop mode, which occur simultaneously. In this mode, the input voltage setting device 1, analog comparator 2 and n-bit DAC 16 are not used.

Before activating the cruise mode, the motor must be running. When the desirable speed is reached, the speed of the motor can be locked upon activation of the cruise mode.

When motor is running, motor speed counter 13 is always running to produce the real time data of the motor speed. The motor speed signal is transferred and saved temporarily to latching register 17 via switch 19.

Upon activation of cruise mode, the most recent speed is latched to the latching register 17, and becomes the reference speed. It will be used to compare with the actual motor speed, which is available from motor speed counter 13.

Comparator 21 is a digital comparator that compares the actual motor speed count from 13 and the latched speed count from 17. The output of comparator 21 is HIGH when the actual speed is lower than the reference speed and the output is LOW when actual speed is higher than the reference.

The system under the cruise mode is controlled as follows. Motor speed counter 13 captures real time speed information from position sensors 12. This information is compared with reference information from the latching register 17 by digital comparator 21. If the current speed is lower than the reference speed, the comparator 21 outputs a HIGH signal. Receiving this high signal via switch 3, the up/down counter 4 increments, leading to a higher DAC 6 output at 7. Based on comparison result from comparator 8, motor 11 demands more current, and increases speed. The speed information is again fed to motor speed counter 13. Conversely, when actual speed goes above the reference speed, comparator 21 output goes LOW and the up/down counter 4 decrements. This sets a lower DAC 6 output 7 and the speed regulates down. This closes the control loop.

Eventually the DAC 6 output 7 will be settled to a level such that the actual speed is close to the reference speed and the up/down counter output 4 is counting within a +/−1 count range. This is the speed of the motor being regulated.

According to the present invention, the electric motor speed controller for vehicles can be arranged only to operate under the throttle mode operation. In this case, in FIG. 2, the blocks 3, 17, 18, 19 and 21 can be omitted.

Also, according to the present invention, the electric motor speed controller for vehicles can be arranged only to operate under the cruise mode operation. In this case, in FIG. 2, the blocks 1, 2, and 15 can be omitted.

Here are the outstanding features of the electric power-assist system controller for manually-operated vehicle described above.

1) The motor speed control loop is able to operate in either throttle mode or cruise mode, achieved through cruise mode select block.

2) Speed information is available from position sensors on a motor, either in the form of digital pulses or analog voltage signal. This speed information is processed by a speed monitor circuit for conversion into an internal speed indication signal that is proportional to the actual speed of the motor to be used to compare with an externally input signal commanded by the vehicle user. This externally input signal command is the user's intended speed of the motor. If the internal speed indication signal indicates that the actual motor speed is lower than the operator's intended speed, the speed control loop reacts in such a way that more current will be driven through the motor to achieve higher speed. Conversely, if the internal speed indication signal indicates that the actual motor speed is higher than the operator's intended speed, the speed control loop reacts in such a way that less current is commanded through the motor to achieve a lower speed.

3) When the internal speed indication signal is lower than the voltage representing vehicle user's intended speed, their comparison result would drive an up/down counter to change, in such a way that this counter output would force a higher current to increase motor speed. Conversely, when the internal speed indication signal is higher than the voltage representing user's intended speed, their comparison result would drive an up/down counter to change, in such a way this counter output would force a lower current to decrease motor speed.

4) When the motor speed reaches the vehicle user's desired speed, upon activation of cruise mode, this motor speed is latched in as a reference. Real-time speed information is available from position sensors on a motor, either in the form of digital pulses or analog voltage signal. This speed information is processed by a speed monitor circuit for conversion into a speed indication signal that is proportional to the actual speed of the motor to be used to compare with the latched reference. If the speed indication signal indicates that the actual motor speed is lower than the latched reference, the speed control loop reacts in such a way that more current will be driven through the motor to achieve higher speed. Conversely, if the speed indication signal indicates that the actual motor speed is higher than the latched reference, the speed control loop reacts in such a way that less current is commanded through the motor to achieve a lower speed.

5) When the speed indication signal is lower than the latched reference, their comparison result would drive an up/down counter to change, in such a way that this counter output would force a higher current in motor to increase motor speed. Conversely, when the speed indication signal is higher than the latched reference, their comparison result would drive an up/down counter to change, in such a way this counter output would force a lower current in motor to decrease motor speed.

6) When the vehicle operator changes the mode of operation from throttle mode to cruise mode, this cruise mode select block changes the up/down counter input from the analog comparator, the purpose of which is to compare a voltage level corresponding to present speed level with an external user input voltage, to the digital comparator, the purpose of which is to compare present speed level in the form of counts with latched reference speed level in the form of counts. This cruise mode select block also disconnects latching register from motor speed counter, leaving the latest motor speed to be latched in the latching register.

7) When the vehicle operator changes the mode of operation from cruise mode to throttle mode, this cruise mode select block changes the up/down counter input to the analog comparator, the purpose of which is to compare a voltage level corresponding to present speed level with an external user input voltage. This cruise mode select block also connects latching register with motor speed counter, so that the latest motor speed is transferred and stored temporarily in the latching register.

The above-described disclosure of the invention in terms of the presently preferred embodiments is not to be interpreted as intended for limiting. Various alterations and modifications will no doubt become apparent to those skilled in the art to which the invention pertains, after having read the disclosure. As a corollary to that, such alterations and modifications apparently fall within the true spirit and scope of the invention. Furthermore, it is to be understood that the appended claims be intended as covering the alterations and modifications.

What is claimed is:

1. An electric motor speed controller for a vehicle, comprising:
   a motor operable to provide a propulsion force to move the vehicle;
   a position sensor provided on the motor to produce position information of the motor;
   a motor speed counter operable to produce an actual motor speed signal;
   a motor power driver operable to deliver electric power to the motor and to produce a drive current signal;
   a pulse width modulation logic controller operable to control the motor power driver based on the position information and a pulse width modulation command signal;

an analog comparator operable to compare the drive current signal with a drive control signal and to produce the pulse width modulation command signal;

an input voltage setting device operable to produce a target motor speed signal;

an analog comparator operable to compare the actual motor speed signal with the target motor speed signal and to produce a comparison result; and an up/down counter operable to increase or decrease a number of counts based on the comparison result, and to produce the drive control signal.

2. The electric motor speed controller according to claim 1, further comprising:

a cruise mode select block operable to produce a cruise mode select signal;

a latch switch operable to turn on instantaneously in response to a starting edge of the cruise mode select signal;

a latching register operable to latch the actual motor speed signal in response to the turn on of the latch switch;

a digital comparator operable to compare the latched motor speed signal from the latching register with the actual motor speed signal from the motor speed counter and to produce a speed comparison result; and a select switch operable to change a connection to the up/down counter between the analog comparator and the digital comparator.

3. A method for controlling a vehicle having an electric motor speed controller according to claim 1, the method comprising:

inputting a voltage signal to the input voltage setting device to produce the target motor speed signal;

comparing the target motor speed signal with the actual motor speed signal captured by the motor speed counter, by the analog comparator, and producing a comparison result thereof;

updating an up/down counter output according to the comparison result, and producing a drive control signal proportional to the counter output;

comparing the drive control signal with the drive current signal generated by the motor power drive by the analog comparator, and producing a comparison result as the pulse width modulation command signal;

driving the motor by the motor power driver, directed by a pulse width modulation signal from a pulse width modulation logic block, wherein the pulse width modulation logic block produces the pulse width modulation signal based on the pulse width modulation command signal and motor position information captured by the position sensor; and producing speed information by the position sensor and motor speed counter, and producing the actual motor speed signal.

4. A method for controlling a vehicle having an electric motor speed controller according to claim 2, the method comprising:

initializing the controller to throttle mode;

inputting a voltage signal to the input voltage setting device to produce the target motor speed signal;

comparing the target motor speed signal with the actual motor speed signal captured by the motor speed counter and converted to analog form, by the analog comparator, and producing the comparison result thereof;

updating an up/down counter output according to the analog comparator comparison result, and producing a drive control signal proportional to the counter output;

comparing the drive control signal with the drive current signal generated by the motor power drive by the analog comparator, and producing a comparison result as the pulse width modulation command signal;

driving the motor by the motor power driver, directed by a pulse width modulation signal from a pulse width modulation logic block, wherein the pulse width modulation logic block produces the pulse width modulation signal based on the pulse width modulation command signal and motor position information captured by the position sensor; and producing speed information by the position sensor and motor speed counter, and producing the actual motor speed signal in digital form, and converting the actual motor speed signal to analog form by a digital to analog converter.

5. An electric motor speed controller for a vehicle, comprising:

a motor operable to provide a propulsion force to move the vehicle;

a position sensor provided on the motor to produce position information of the motor;

a motor speed counter operable to produce an actual motor speed signal;

a motor power driver operable to deliver electric power to the motor and to produce a drive current signal;

a pulse width modulation logic controller operable to control the motor power driver based on the position information and a pulse width modulation command signal;

an analog comparator operable to compare the drive current signal with a drive control signal and to produce the pulse width modulation command signal;

an up/down counter operable to increase or decrease a number of counts based on a comparison result, and to produce the drive control signal;

a cruise mode select block operable to produce a cruise mode select signal;

a latch switch operable to turn on instantaneously in response to a starting edge of the cruise mode select signal;

a latching register operable to latch the actual motor speed signal in response to the turn on of the latch switch; and a digital comparator operable to compare the latched motor speed signal from the latching register with the actual motor speed signal from the motor speed counter and to produce a speed comparison result.

6. The electric motor speed controller according to claim 5, further comprising:

a select switch operable to change a connection to the up/down counter between the analog comparator and the digital comparator.

7. A method for controlling a vehicle having an electric motor speed controller according to claim 5, the method comprising:

activating a vehicle cruise mode by the cruise mode select block;

capturing and latching the latest vehicle speed as a reference signal with the latching register and latch switch;

comparing the reference signal with the actual motor speed signal captured by the motor speed counter, by the digital comparator, and producing the comparison result thereof;

updating an up/down counter output according to the comparison result, and producing a drive control signal proportional to the counter output;

comparing the drive control signal with the drive current signal generated by the motor power drive by the analog comparator, and producing a comparison result as the pulse width modulation command signal;

driving the motor by the motor power driver, directed by a pulse width modulation signal from a pulse width modulation logic block, wherein the pulse width modulation logic block produces the pulse width modulation signal based on the pulse width modulation command signal and motor position information captured by the position sensor;

producing speed information by the position sensor and motor speed counter, and producing the actual motor speed signal.

8. The method for controlling a vehicle according to claim 7, further comprising:

keeping the throttle mode operation until activation of the vehicle cruise mode, wherein the cruise mode activation is initiated by the cruise mode select block, and disabling the functioning of the input voltage setting device and the analog comparator, while enabling the functioning of the digital comparator; and keeping the cruise mode operation until deactivation of the vehicle cruise mode, wherein the cruise mode deactivation is initiated by the cruise mode select block, and is enabling the functioning of the input voltage setting device and the analog comparator, while disabling the functioning of the digital comparator.

9. An electric motor speed control method for controlling a vehicle having a motor operable to provide a propulsion force to move the vehicle, the method comprising:

producing position information of the motor;

producing an actual motor speed signal;

delivering electric power to the motor and producing a drive current signal;

controlling the motor based on the position information and a pulse width modulation command signal;

comparing the drive current signal with a drive control signal and producing the pulse width modulation command signal;

producing a target motor speed signal;

analog-comparing the actual motor speed signal with the target motor speed signal to produce a comparison result; and increasing or decreasing the level of the drive control signal based on the comparison result, and producing the drive control signal.

10. The electric motor speed control method according to claim 9, further comprising:

producing a cruise mode select signal;

turning on instantaneously in response to a starting edge of the cruise mode select signal;

latching the actual motor speed signal in response to the turning on;

digital-comparing the latched motor speed signal with the actual motor speed signal, and producing a speed comparison result; and changing a connection to an up/down counter, which increases or decreases the level of the drive control signal, between the analog-comparing and the digital-comparing.

11. An electric motor speed control method for controlling a vehicle a motor operable to provide a propulsion force to move the vehicle, the method comprising:

producing position information of the motor;

producing an actual motor speed signal;

delivering electric power to the motor and producing a drive current signal;

controlling the motor based on the position information and a pulse width modulation command signal;

comparing the drive current signal with a drive control signal and producing the pulse width modulation command signal;

producing a cruise mode select signal;

turning on instantaneously in response to a starting edge of the cruise mode select signal;

latching the actual motor speed signal in response to the turning on;

comparing the latched motor speed signal from the latching register with the motor speed signal from the motor speed counter to produce a speed comparison result; and increasing or decreasing the level of the drive control signal based on the speed comparison result, and producing the drive control signal.

* * * * *